United States Patent
Kim et al.

[11] Patent Number: 5,843,305
[45] Date of Patent: Dec. 1, 1998

[54] SEWAGE AND WASTEWATER TREATMENT PLANT USING ANAEROBIC AND AEROBIC MICROORGANISMS

[75] Inventors: Dong Wook Kim, Seoul; In Kook Kang, Kyungki-do; Jin Han Chang; Jie Soo Kim, both of Kyunggi-do, all of Rep. of Korea

[73] Assignee: Hyundai Engineering Co., Ltd., Seoul, Rep. of Korea

[21] Appl. No.: 805,724

[22] Filed: Feb. 25, 1997

[51] Int. Cl.[6] .................................................. C02F 3/30
[52] U.S. Cl. .................. 210/151; 210/188; 210/195.4; 210/259; 210/605
[58] Field of Search .................................. 210/150, 151, 210/188, 195.3, 195.4, 259, 605

[56] References Cited

U.S. PATENT DOCUMENTS

| | | | |
|---|---|---|---|
| Re. 32,597 | 2/1988 | Pette | 210/188 |
| 3,741,393 | 6/1973 | Estes et al. | 210/195.4 |
| 3,805,957 | 4/1974 | Oldham et al. | 210/195.4 |
| 4,166,791 | 9/1979 | Marvin | 210/188 |
| 4,758,339 | 7/1988 | Vellinga | 210/188 |
| 4,895,645 | 1/1990 | Zorich, Jr. | 210/150 |
| 4,925,552 | 5/1990 | Bateson et al. | 210/150 |
| 4,933,076 | 6/1990 | Oshima et al. | 210/151 |
| 5,316,668 | 5/1994 | Tang | 210/151 |
| 5,500,112 | 3/1996 | McDonald | 210/151 |
| 5,578,202 | 11/1996 | Hirane | 210/151 |

*Primary Examiner*—Christopher Upton
*Attorney, Agent, or Firm*—Jacobson, Price, Holman & Stern, PLLC

[57] ABSTRACT

A sewage and wastewater treatment plant which comprises a bioreactor having an anaerobic treatment tank for anaerobic treatment, an aerobic contacting tank and a microorganism separation tank located in between the anaerobic and aerobic tanks respectively. In the anaerobic and aerobic tanks a media is provided in a layered honeycomb type arrangement for distributing the wastewater and sewage to be treated and for adherence of microorganisms.

7 Claims, 3 Drawing Sheets

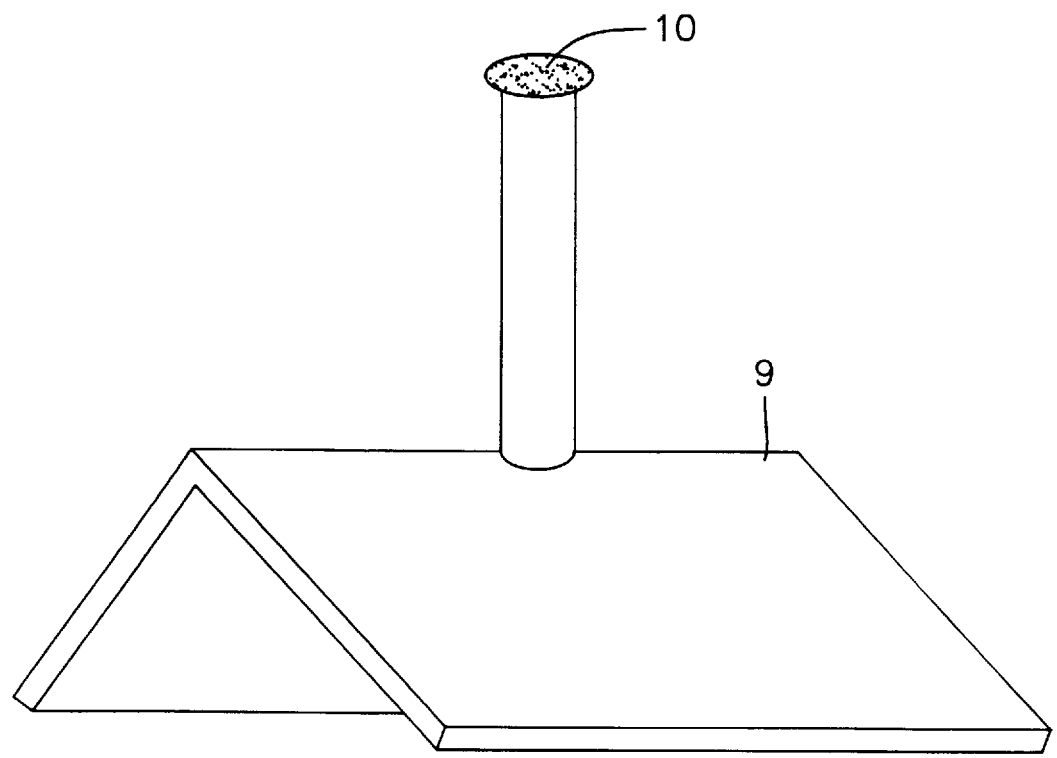

US 5,843,305

SEWAGE AND WASTEWATER TREATMENT PLANT USING ANAEROBIC AND AEROBIC MICROORGANISMS

BACKGROUND OF THE INVENTION

1. Field of the Invention

The present invention relates to a sewage and wastewater treatment plant for treating all sorts of organic industrial wastewater, urban sewage, or the like, and more particularly to an economical sewage and wastewater treatment plant, wherein both an anaerobic treatment method for high concentration wastewater and an aerobic treatment method for low concentration wastewater are used effectively, so as to provide a simple and economical operation.

2. Description of the Related Technology

An anaerobic treatment method for high concentration wastewater generally has a high efficiency, even at a high loading rate, wherein high temperature anaerobic microorganisms (53°~57° C.), moderate temperature anaerobic microorganisms (33°~37° C.), and low temperature anaerobic microorganisms (20°~25° C.) are used. It is known that, at various temperatures, the high temperature anaerobic microorganisms degrade organic materials at the fastest rate, next are the moderate temperature anaerobic microorganisms, and last, the low temperature anaerobic microorganisms.

Considering only the respective degradation rates of organic materials, it seems that methods which use the high temperature anaerobic microorganisms would be the most effective. However, in order to treat wastewater with high temperature microorganisms the temperature must be raised to between 53°~57° C. and hence excessive energy is wasted rendering the method of no commercial value. In addition to that, the high temperature anaerobic microorganisms react sensitively to operating conditions such as temperature, pH, or the like, making them difficult to deal with. Therefore, methods which use high temperature anaerobic microorganisms have not been widely used unless a high temperature wastewater is generated naturally. For that reason, the most widely used anaerobic method is an anaerobic method which utilizes an optimal temperature of between 33°~37° C. And, in fact the application range has become gradually wide.

Anaerobic treatment has many advantages compared with aerobic treatment. For example, even under high concentrations of organic materials it is possible to maintain a high level of degradation efficiency, a processing waste sludge is scarcely generated, and particularly, in the case of anaerobic treatment of high concentration waste water, any methane gas ($CH_4$) generated during the treatment process can be used as energy to raise the temperature of the wastewater and the treatment process is possible without additional energy.

On the other hand, when moderate temperature anaerobic treatment is used to treat low concentration wastewater such as sewage, the amount of sludge generated is low and the amount of gas generated is too small to use as a source of replacement energy, therefore it is not economical.

Recently, a study applying the low temperature anaerobic method to sewage and wastewater treatment actively proceeded. It was found that the organic removal rate decreases more or less but economical treatment is possible without additional energy. In addition to that, the organic concentration after anaerobic treatment is low, the amount of generating excess sludge is small, and as a result, the sludge treatment cost is cut down. Therefore, an economical treatment is made possible. Despite these advantages, however, the anaerobic treatment process has not been actively used. The reason is that the anaerobic compartment is generally separated from the anaerobic compartment, so the treatment plant includes an anaerobic compartment, an aerobic compartment, and a final sedimentation compartment. This means that the process is complex, the initial equipment investment cost is high, and it is not easy to operate the treatment plant compared to general sewage and wastewater treatment processes.

SUMMARY OF THE INVENTION

Accordingly, the present invention has been made in an effort to solve the problems occurring in the prior technology. Therefore, it is an object of the present invention to provide a sewage and wastewater treatment plant, whose processing is simple, the initial equipment investment cost is low, and operation is easy.

According to one aspect of the present invention, a combined anaerobic and aerobic process is provided wherein organic materials in the influent sewage and wastewater are degraded to a degree of 60~70% by the anaerobic microorganisms located in the anaerobic treatment compartment, and the remainder are also degraded by the aerobic microorganisms attached to media.

The above treatment plant is a single tank having an interior which is compartmentalized into three parts, from left to right. In the front section of the tank there is an anaerobic treatment compartment, in the center section of the tank there is a microorganism separating compartment and therein there is a microorganisms separating apparatus installed in order to prevent the loss of anaerobic microorganisms caused by rising generating gas. And, in the rear section of the treatment plant tank, for aerobic treatment methods, an aerobic contacting compartment is provided in which the amount of excess sludge is small and sludge bulking scarcely occurs.

The anaerobic compartment in the front section consists of 0.5 W of the entire treatment plant and under normal operating state has a microorganism concentration of between 20,000~30,000 mg/l by total solid substances. As seeding microorganisms, activated anaerobic microorganisms from the anaerobic treatment tank are used and the seeding amount of microorganisms is determined by the concentration of the total solid substances, however approximately to 50% of the volume of the anaerobic treatment tank. At the beginning of seeding, because of a sudden temperature change, it is difficult for the anaerobic microorganisms to adapt to the environment and the degradation of organic materials is not great. However, as time proceeds, the microorganisms gradually adapt to the environment and after about 10 days, normal degradation of organic materials is possible. Also, media are fed to the upper portion of the anaerobic treatment tank, to a height of 0.2 H, as that results in security of microorganisms and influent sewage and wastewater are equally distributed.

In the bottom portion of the microorganisms separating tank, anaerobic reactions also proceed, organic materials are degraded, and the digestion gas generated during the degradation of organic materials is given off. While the digestion gas rises, surrounding microorganisms can simultaneously rise which can cause a loss of microorganisms. To prevent such a loss of microorganismsa Gas-Solid Separator (GSS) is installed in the microorganism separating tank located in the center of the treatment plant. This microorganism separating tank occupies 0.2 W of the total width of a bio-reactor.

An aerobic contacting tank, which is located in the rear part of the bio-reactor, occupies 0.3 W and is filled with media on microorganisms in order to secure a plurality of fixed aerobic microorganisms. At the bottom of the aerobic contacting tank, a distributor is installed for providing oxygen to the microorganisms. Active microorganism present in sewage are used as seeding microorganisms and occupy 20~30% volume of the aerobic contacting tank. After initial seeding, by continuous oxygen supply, suspended aerobic microorganisms gradually come to adhere to the surface of media.

As a result of passing through an anaerobic treatment tank, 60~70% of organic materials in influent sewage and wastewater are removed and passing through a rear aerobic contacting tank, 80~90% of the remaining organic materials are removed. Thus, as a result of passing through an entire bio-reactor, the total amount of organic materials removed is about 92~98%.

As described above, if only an aerobic treatment process is sued to treat sewage and wastewater, a quantity of sludge is generated, the excess of which must be removed periodically. However, according to the present invention, the amount of sludge is so small that a high efficiency treatment process is possible.

BRIEF DESCRIPTION OF THE DRAWINGS

The above objects, and other features and advantages of the present invention will become more apparent through the following detailed description taken in conjunction with the drawings, in which:

FIG. 3 is a perspective view of a Gas-Solid-Separator (GSS) of FIG. 1.

DETAILED DESCRIPTION OF THE PREFERRED EMBODIMENTS

Figure 1:
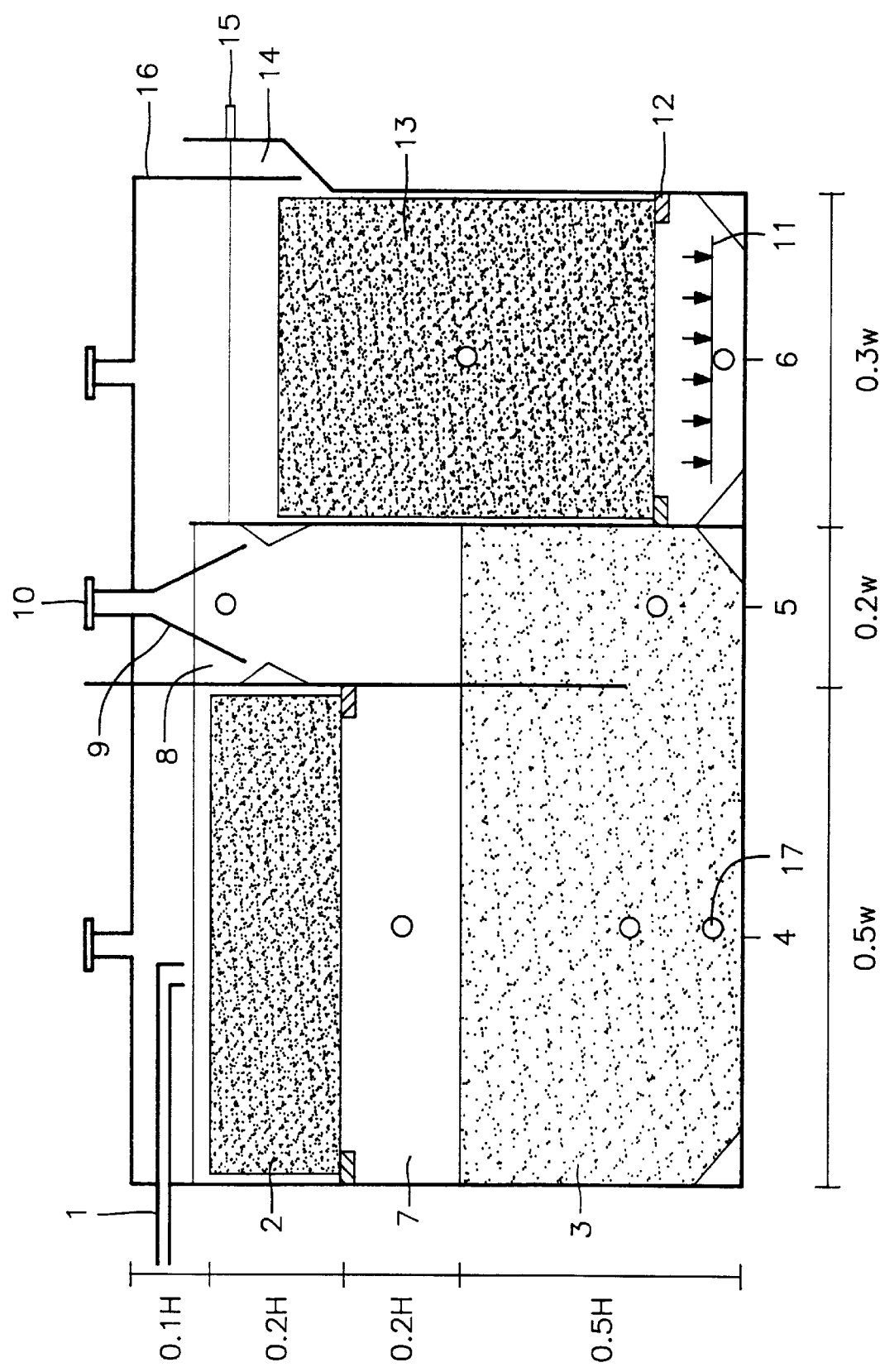
FIG. 1 is a cross-sectional view of the biological treatment plant according to the present invention.

FIG. 1 illustrates a biological sewage and wastewater treatment plant according to the present invention. A bio-reactor includes three regions, a front part, a center part, and a rear part which occupy a width of 0.5 W, 0.2 W, and 0.3 W, respectively, of the entire bio-reactor. The front part refers to an anaerobic treatment tank 4, the center part refers to a microorganism separating tank 5, and the rear part refers to an aerobic contacting tank 6.

The interior of the anaerobic treatment tank 4 includes a media layer 2, which is located under an inlet 1, and which is fixed on supporters and occupies a height of 0.2 H; a space 7 is provided under the media 2 having a height of 0.2 H; and an anaerobic sludge bed 3 at the bottom of the anaerobic treatment tank, below the space 7, which occupies a height of 0.5 H. Influent sewage and wastewater is dispersed properly within the entire reaction tank by the media 2 in the anaerobic microorganisms treatment tank 4. Media 2 assists in the degradation of the influent wastewater and has anaerobic microorganisms of about 1~2 mm thickness adhered on its surface. The media 2 is in a fixed state and consists of a plurality of crossflow-type media sheets which contact each other and are in a layered arrangement.

Figure 2:
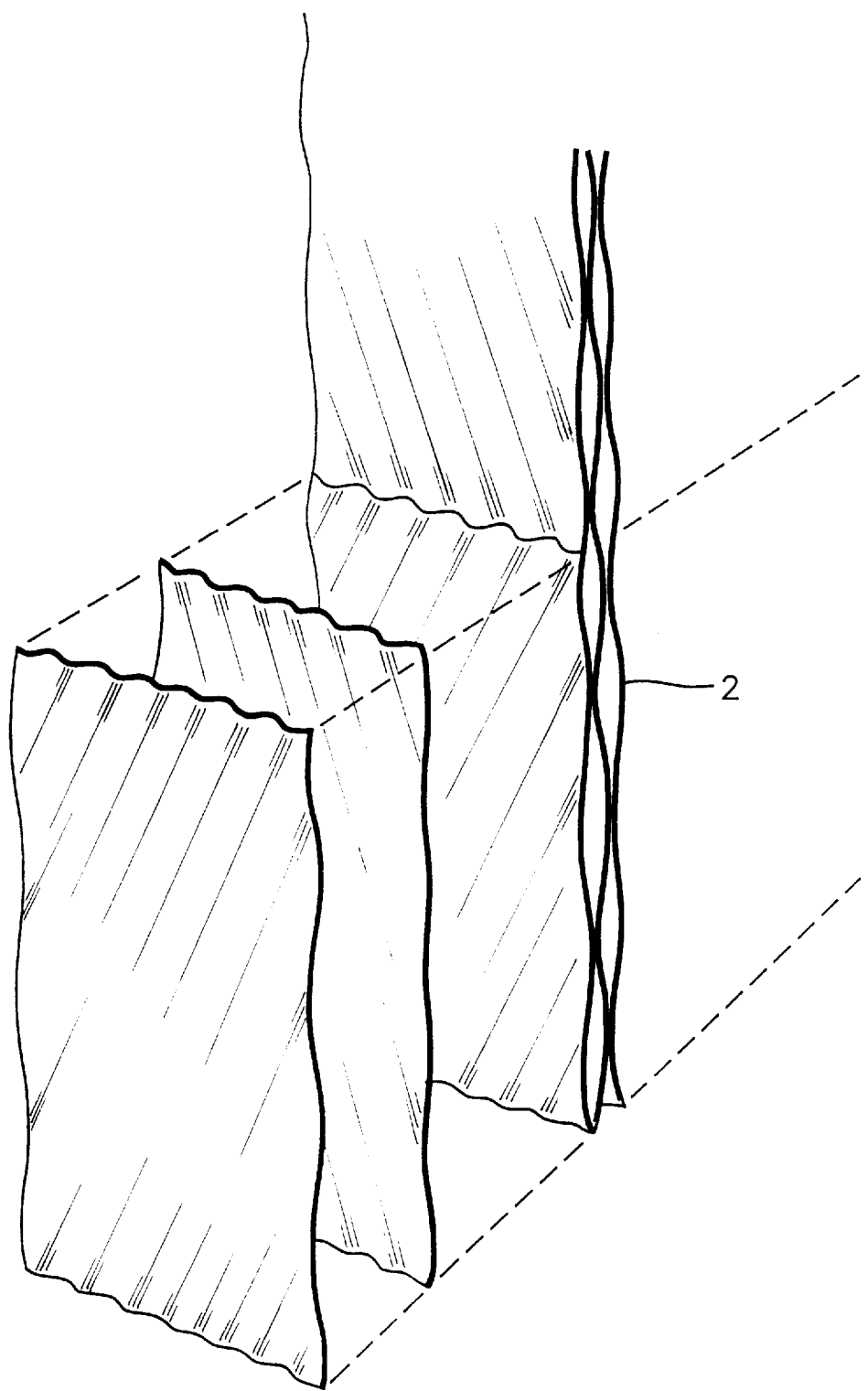
FIG. 2 is a partial enlarged perspective view of media layer of FIG. 1.

Referring to FIG. 2, the arrangement of the media 2 is such that each media sheet contacts adjacent media sheets in an alternating pattern so that gaps between media sheets are formed. When the media 2 is complied of its many layers the gaps form a zigzag shape so that the gap ratio increases.

Referring to FIG. 1, sewage and wastewater, having miscellaneous articles eliminated, such as waste food, vinyl and paper, prior to entering, flow into inlet land pass through media layer 2 which acts to distribute the flow of sewage and wastewater and on which anaerobic microorganisms are adhered. Organic materials are degraded by the anaerobic microorganism in the anaerobic treatment tank 4. During the degradation of organic materials, gas, such as methane ($CH_4$) and carbon dioxide ($CO_2$), is generated. Anaerobic degradation process means that organic materials are degraded to methane and carbon dioxide by microorganism, without oxygen ($O_2$). This degradation process consists of a hydrolysis step, an organic acid producing step and a methane producing step.

In order to prevent the anaerobic microorganisms from rising upward together with the gas generated during the anaerobic treatment process, a Gas-Solid Separator (GSS) 9 is provided in the microorganism separating tank 5, located in the center of the bio-reactor, wherein the rising microorganisms are separated. After that, the treated sewage and wastewater having 60~70% of the organic materials eliminated overflows into an aerobic contacting tank 6. The gas generated in this phase of the process is exhausted out through an exhaust outlet 10 in the upper portion of the Gas-Solid-Separator 9, and the microorganisms from the gas are precipitated. A gas diverter 8 is provided adjacent to the Gas-Solid Separator 9. At this time, 30% of the height of the Gas-Solid-Separator 9 is above the level of the liquid in order to provide an exhausting effect.

In the aerobic tank 6, there is media 13 fixed on supports 12; however, this media 13 has a different role than the media 2 in the anaerobic treatment tank 4. The role of media 13 is for the adherence of aerobic microorganisms, and by the adherence of the microorganisms, the remaining organic materials are removed. Also, in the aerobic contacting tank 6, an air diffuser 11 is installed for providing oxygen continuously to the aerobic microorganisms. By the air diffuser 11, a density of optimal dissolved oxygen may be maintained.

Water which has passed through both the anaerobic and aerobic treatment processes is separated in a precipitation part 14 installed on the upper portion of the aerobic contacting tank 6 and is exhausted out through an outlet 15. In order to minimize the overflow of microorganisms in the aerobic contacting tank 6, a precipitation separating stand 16 is installed between the aerobic contacting tank 6 and the precipitation part. Since the amount of anaerobic microorganisms in the anaerobic treatment tank 4 does not change, even with time, it is not necessary to remove excess sludge; however, as time passes, the activity may decrease as a result and thus it is necessary to remove sludge until there is between 5~10% of the volume of the anaerobic treatment tank 4 through a sludge elimination pipe 17 once every 3~4 months, periodically.

FIG. 3 illustrates a microorganisms separating apparatus having a triangular shape and has a hole on the upper part for exhausting out gas separated from the microorganisms smoothly.

The invention has been described through preferred embodiments. However, various modifications can be made without departing from the scope of the invention as set forth in the following claims.

What is claimed is:

1. A sewage and waste water treatment system comprising:

a compartmentalized bio-reactor having an inlet for introduction of influent into a first reaction compartment, the first reaction compartment comprising anaerobic microorganisms and having a layered media in an upper region thereof, positioned below the inlet, for distribution of the influent evenly throughout the first reaction compartment; a second reaction compartment comprising aerobic microorganisms and having a layered media for adherence of the aerobic microorganisms and a precipitation portion in an upper region thereof for separating out purified water from the system; and a middle compartment located between the first and second reaction compartments having a gas-solid separator for separation of rising gas from the anaerobically treated influent.

2. The system of claim 1, further comprising the bio-reactor having a width and the first reaction compartment having a width equal to about 50% of the width of the bio-reactor.

3. The system of claim 2, further comprising the second reaction compartment having a width equal to about 30% of the width of the bio-reactor.

4. The system of claim 3, further comprising the middle compartment having a width equal to about 20% of the width of the bio-reactor.

5. The system of claim 1, further comprising the layered media having a honeycomb arrangement.

6. The system of claim 5, further comprising the layered media being suspended, within the first and second reaction compartments, on support members.

7. A sewage and waste water treatment system comprising:

a bio-reactor having a series of horizontally spaced compartments;

a first reaction compartment of the bio-reactor having an inlet for influent to be treated, anaerobic microorganisms and a layered media, in which compartment the influent is treated anaerobically;

a second reaction compartment of the bio-reactor having aerobic microorganisms and a layered media, in which compartment the waste water is treated aerobically;

a precipitation portion of the bio-reactor, in which purified waste water is separated out of the bio-reactor; and a middle compartment, located between the first and second reaction compartments, having a gas-solid separator for separating rising gas from anaerobic microorganisms.

* * * * *